Aug. 28, 1962 R. H. WEILAND ET AL 3,051,419
OVERHEAD CARGO HANDLING MECHANISM FOR SWING-TAIL AIRPLANES
Filed Aug. 10, 1959 2 Sheets-Sheet 1

INVENTORS.
RICHARD H. WEILAND
DONALD W. KELTON
BY
Reynolds, Beach & Christensen
ATTORNEYS INVENTORS:
RICHARD H. WEILAND
DONALD W. KELTON
BY
Reynolds, Beach & Christensen
ATTORNEYS

United States Patent Office 3,051,419
Patented Aug. 28, 1962

3,051,419
OVERHEAD CARGO HANDLING MECHANISM
FOR SWING-TAIL AIRPLANES
Richard H. Weiland and Donald W. Kelton, Seattle, Wash., assignors to Boeing Airplane Company, Seattle, Wash., a corporation of Delaware
Filed Aug. 10, 1959, Ser. No. 832,612
8 Claims. (Cl. 244—137)

This invention concerns generally a cargo airplane, and relates specifically to cargo handling equipment carried by a cargo airplane of a particular type, namely, one wherein a tail section or other end closure section which in flight position constitutes a continuation of the fuselage, can be swung aside or up about a hinge axis into a loading position to afford clear, straight-in access to the cargo space within the fuselage, accessible through the latter's open end. If the closure section is the tail section, in flight position it closes the open rear end. Since the tail section will normally carry the usual empennage, the control cables or like control elements will extend across the hinge line, and through the tail section, and in one design may obstruct some of the interior thereof so that it is unavailable as cargo space. Airplanes of the types mentioned constitute the subjects of companion applications of Raymond E. Pearson and of Richard H. Weiland, Serial Nos. 832,699 (now Patent No. 2,977,077) and 832,700, respectively, filed August 10,1959, and reference is made thereto for details of the airplane itself.

Cargo can be handled between the ground and the materially elevated cargo deck of such an airplane in various ways and by various equipment. The companion appliaction of Richard H. Weiland and Ray W. Hamilton, Serial No. 832,701, filed August 10, 1959 now Patent No. 3,002,719, illustrates equipment utilizing tracks, ramps, and the like extending between ground level and deck level, for guidance of cargo units. The present invention is directed to specifically different cargo handling equipment utilizing overhead track means carried by the fuselage, and including outboard track extensions which can be folded and stowed in small space during flight, but capable of extension beyond the closed position of the closure section into cargo handling position. In the latter position it is at least supported by reaction from the fuselage, whether directly or through the closure section which is itself thus supported. If, as preferred, the track extension is mounted upon the closure section, the mounting can be so arranged that movement of the closure section into its open or loading position automatically positions the track extension in alignment with the fuselage mounted track means, but extending so far beyond the closed position of the closure section that interference would prevent closure of the latter, except for the folding of the track extension.

The track means and its extension may take various forms, including further extensions also supported by reaction from the fuselage, whereby cargo units of considerable length can be handled. A carriage is or carriages are guided for movement along the track means proper, within the fuselage, and extensions thereof, and hoists supported thereon enable lifting or lowering of cargo between the ground level and the cargo deck level. The use of overhead track means keeps the cargo deck clear of elevators or the like, as disclosed in the companion application of Weiland and Hamilton, and affords the ability to handle all types of cargo with airborne equipment carrying the least weight penalty.

The invention is shown in representative forms in the accompanying drawings, and the principles of the invention will be made clear in the claims hereof.

FIGURE 3 is a similar view, with further extended track extensions, and with parts in position to handle a long missile or the like.

Figure 1:
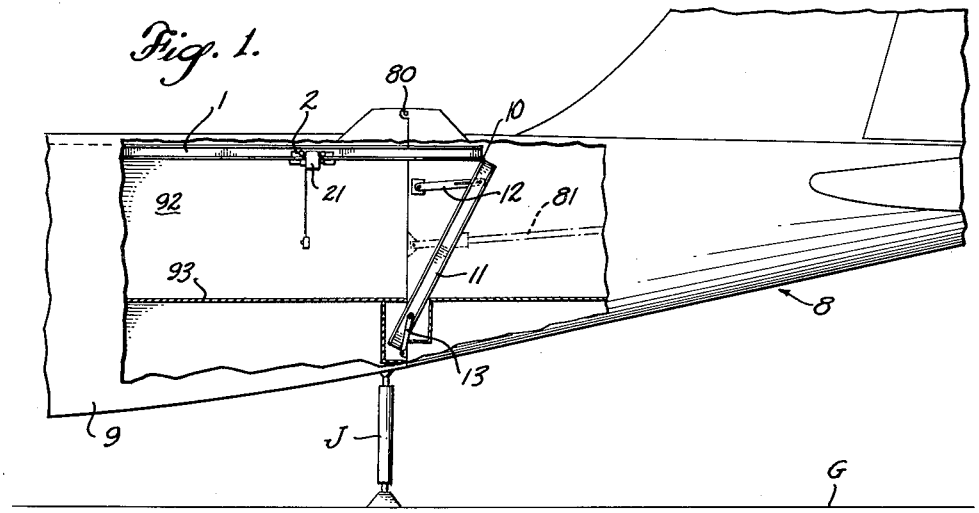
FIGURE 1 is a side elevation, broken away, with the track means stowed and the tail section in its flight position, but with an auxiliary jack bracing the fuselage from the ground.

Only the rear portion of the fuselage 9 is shown in the drawings but it will be understood that the fuselage is airborne by wings 90 (FIGURE 4) and groundborne by landing gear indicated at 99. Because of the droop of the wing tips and the depending engines generally hung beneath the wing in pods, the fuselage is necessarily at an appreciable height above the ground line G.

At its rear end the fuselage terminates in an opening 91 admitting to the cargo space 92, in which cargo is supported upon a deck 93. This deck, in a specific design, is some ten feet above ground level G. A tail section generally indicated by the numeral 8 is formed as a smooth rearward continuation of the fuselage 9, with parts in flight position, and is hingedly mounted upon the fuselage. The hinge line indicated at 80 may be disposed horizontally and transversely above the top of the fuselage, as in FIGURES 1 to 3, inclusive, or the hinge line as indicated at 80' in FIGURE 4 may be vertically disposed at one side of the fuselage. Swinging of the tail section upon the hinge axis 80 or 80' affords free access through the rear opening 91 for straight-in loading of cargo into or from the cargo space 92. The tail section 8, as disclosed in the Pearson application or in the Weiland sole application mentioned above, may carry the empennage (not shown except fragmentally in the present drawings) by which the airplane is controlled in flight, and control cables or the like may extend from within the fuselage across the hinge line to the movable control surfaces, but these have been omitted for clearness of understanding and because they do not form any part of the present invention. Likewise, locking means are provided for securing the tail section in its flight position, but these are not illustrated herein. Reference is made to the Weiland and Pearson applications for such details.

Movement of the tail section 8 between its loading position and its flight position is preferably accomplished by means such as the lead screw 81 rotatable within a nut 82 carried by the tail section 8, or the nut may be rotatable with respect to the non-rotative lead screw. The other end of the lead screw is supported as at 94 from the fuselage. This screw and nut securely hold the tail section in any open position. The details of the mechanism for accomplishing this movement may vary widely and are not herein specifically shown. Primarily, the means for moving the tail section will, in any open position of the latter, constitute a secure brace whereby the tail section may support an appreciable load and act as means to transmit such a load from cargo handling equipment supported in part by the tail section, back to the fuselage. A jack J may be employed adjacent the rear end of the fuselage to transmit such loads to the ground. It is immaterial whether the lead screw or screws 81 incline from the fuselage upwardly and rearwardly to a vertically tiltable tail section or whether such means. as in FIGURE 4, extend laterally to maintain the tail section swung to one side.

Figure 2:
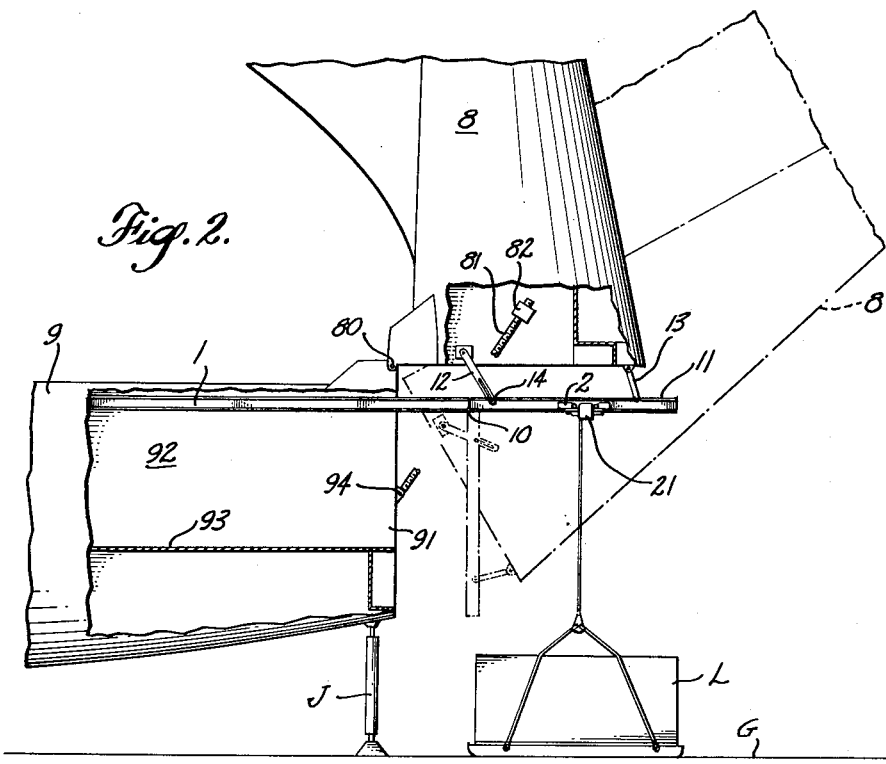
FIGURE 2 is a similar view, showing in full lines the cargo handling equipment loading cargo, and in dot-dash lines parts in an intermediate position.
Figure 3:
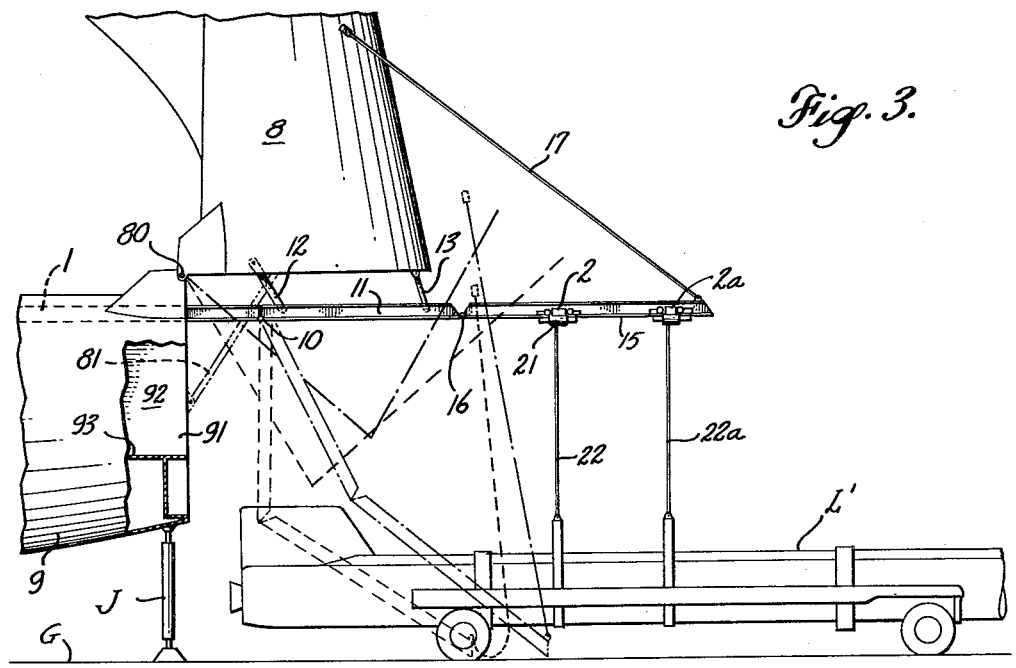

The cargo handling equipment according to the present invention includes overhead single or dual track means 1 (preferably the latter) installed within the upper portion of the fuselage and extending to or rearwardly beyond the opening 91 and, in addition thereto, a track extension 11 which in effect is a rearward extension of the track means proper, at 1, and which terminates well to the rear of the open end at 91; in a specific design it extends in excess of twelve feet. The extension 11 is preferably hingedly connected at 10 to the track means 1 but is connected, for guidance in its movement between cargo handling and stowed positions, to the tail section 8. For instance, as shown in the forms of FIGURES 1 to 3, inclusive, links 12 and 13 interconnect the extension 11 and the tail section 8 in such manner that as the tail section swings to its open or loading position, the track extension 11 is swung upwardly from a stowed position as shown in FIGURE 1 to a cargo handling position as shown in FIGURE 2. Since the extension 11 is pivotally connected at a fixed pivot 10 carried by the fuselage, a pin and slot connection is provided at 14 between the link 12 annd the track extension 11. In the open or loading position of the tail section the track extension 11 constitutes a rearward extension in alignment with the fixedly mounted track means 1 whereas, when the tail section 11 swings to its closed position, the track extension 11 will swing downwardly and somewhat forwardly as is shown by comparison of the full line position in FIGURE 2 and the dot-dash line position thereof, and further in comparison with the full line position of FIGURE 1. In the closed position of the tail section, the extension 11 is automatically stowed within the tail section where it is out of the usable cargo space, and yet by swinging open of the tail section the track extension is automatically placed in proper position for use. In its position of use, it is strongly supported by the bracing lead screw or screws 81 and by the jack J, if the latter employed; but, in any event, it reacts from the fuselage to maintain and support its load L.

A carriage 2 is mounted on the track means 1, and in the loading position upon the extension 11, for movement longitudinally of the fuselage into and from the open rear end at 91. Hoist means 21 upon the carriage 2 enables the lifting or lowering of cargo units between the ground level and the level of the deck 93.

It may happen that the cargo unit to be handled is of quite appreciable length and hence not readily manageable by a single hoist cable 22, with relation to which it would have to be balanced. Such a situation is shown in FIGURE 3. In order to handle such a load $L^1$ a further track extension 15 is employed, this being preferably hingedly connected at 16 to the rear end of the track extension 11. In loading position the further extension 15 is supported from the tail section 8 and hence reacts also from the fuselage, by means such as the brace or guy cable 17. Now it is possible to employ a second carriage 2a, also with a hoist 21, and to utilize a second hoisting cable 22a spaced in the longitudinal direction from the hoist cable 22. In this manner it is possible to handle such an elongated or awkward load $L^1$ as suggested in FIGURE 3.

The extension 15 need not be permanently connected at 16, and usually would only be so connected when required for use. When so connected, swinging of the tail section 8 in this form of the invention from its open to its flight position will cause the further extension 15 to hinge or dog-leg downwardly with relation to the extension 11 which, in turn, swings about its pivot at 10, the movement of the further extension 15 being controlled by its guy cable 17. The two sections ultimately fold nearly alongside one another, whereupon the cable 17 and hinge pin 16 may be disconnected, and the extension 15 made fast for flight.

Figure 4:
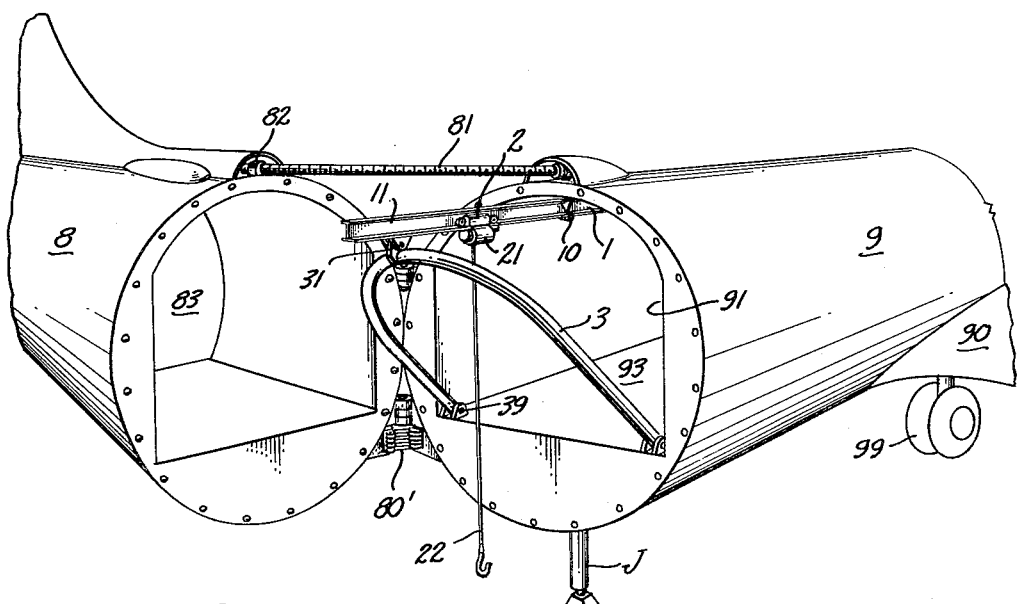
FIGURE 4 is an isometric view, showing the adaptation of the cargo-handling equipment to a differently hinged tail section.

If the tail section 8 is hingedly mounted to swing aside as in the form of FIGURE 4, the track extension 11 can still be adequately supported in its extended position by an inverted U-frame or brace 3 which can be releasably secured to the outer or rear end of the extension 11 as indicated at 31, and which is permanently or releasably supported from the fuselage or the deck 93 of the cargo space as indicated at 39. Such a support firmly braces the extended track from the fuselage and does not interfere with free access of cargo to and from the cargo space. The tail section 8 is shown in this form as having a sufficient clear space 83 to receive the U-frame 3 when the latter is laid substantially horizontally. It will be understood that the extension 11 cannot be left thus extended even when the tail section swings to one side, for the reason that the track means being located adjacent the upper level of the cargo space, the rear end of the extension 11 would be well outside the locus of space 83, and would interfere with the closing of the tail section unless the extension 11 were first folded down and so retracted into its stowed position.

Such cargo handling equipment is readily installed within the airplane, does not occupy any appreciable or usable portion of the caro space, and is always ready for use when needed. It is of minimum weight and is readily controlled and operated by power means available aboard such airplanes.

We claim as our invention:

1. A cargo airplane including a fuselage open at an end for access to a cargo space within it, a closure section hingedly mounted thereon for swinging between a flight position, wherein it closes the open end of the fuselage, and a loading position, clear of such open end and affording access to the cargo space, means in addition to the hinge mounting inter-connecting the fuselage and the closure section for supporting the latter in its loading position, overhead track means proper within the cargo space and supported by the fuselage, an extension of said track means separate from the latter and shiftable from a stowed position into a loading position externally of the fuselage and aligned with the track means proper, means intermediate the closure section and said extension, when both are in the loading position, supporting the extension from the closure section, and hoist means guided for movement along said track means and its extension through the open end of the fuselage, for handling cargo between the levels of the ground and the cargo space.

2. A cargo airplane including a fuselage open at one end for access to a cargo space within it, a closure section hingedly mounted thereon for swinging between a flight position, wherein it closes the open end of the fuselage, and a loading position, clear of such open end and affording access to the cargo space, overhead track means proper within the cargo space and supported by the fuselage, an extension of said track means separate from the latter and hingedly mounted upon the track means proper for shifting from a stowed position into operative loading position aligned with the track means proper, and of such length that when in its loading position it extends beyond the loading position of the closure section, means interconnecting said extension and the closure section and controlling the extension for folding into a stowed position within the latter when the closure section moves into its flight position, and conversely for unfolding into its loading position when the closure section moves into its loading position, and hoist means guided for movement along said track means and its extension, through the open end of the fuselage, for handling cargo between the levels of the ground and the cargo space.

3. A cargo airplane as in claim 2, including brace means reacting between the fuselage and the extension of the track means for supporting the outboard end of the track extension in its cargo handling position.

4. A cargo airplane as in claim 2, wherein the interconnection between the extension of the track means and the closure section is arranged to support said extension from the closure section when both are in the loading position.

5. A cargo airplane including a fuselage open at an end, a closure section hingedly mounted thereon for swinging upwardly from a flight position, wherein it forms a streamlined continuation of the fuselage, to a loading position, wherein it affords free access to the open end of the cargo space within the fuselage, means in addition to the hinge mounting supporting the closure section from the fuselage in its upswung loading position, overhead track means proper carried by the fuselage within the cargo space, an outboard extension of said track means of a length when aligned with the track means proper to extend beyond the loading position of the closure section, means supporting said extension from the closure section, to swing with the latter from and into alignment with the fuselage-mounted track means, as the closure section swings towards and from its flight position, and cargo handling equipment, including hoist means, movable along said track means and said extension thereof.

6. A cargo airplane including a fuselage open at an end, a closure section hingedly mounted thereon for swinging upwardly from a flight position, wherein it forms a streamlined continuation of the fuselage, to a loading position, wherein it affords free access to the open end of the cargo space within the fuselage, means in addition to the hinge mounting supporting the closure section from the fuselage in its upswung loading position, overhead track means proper carried by the fuselage within the cargo space, an outboard extension of said track means movable into and from alignment with the track means proper, two links, a first nearer the hinge of the closure section and a second more distant from such hinge, interconnecting the closure section and the track extension, and guiding the latter between its aligned position, as the closure section swings into its loading position, and a stowed position as the closure section swings into its flight position, and cargo handling equipment, including hoist means, movable along said track means proper and said extension thereof.

7. A cargo airplane including a fuselage open at an end, a closure section hingedly mounted thereon for swinging upwardly from a flight position, wherein it forms a streamlined continuation of the fuselage, to a loading position, wherein it affords free access to the open end of the cargo space within the fuselage, means in addition to the hinge mounting supporting the closure section from the fuselage in its upswung loading position, overhead track means proper carried by the fuselage within the cargo space, with its external end adjacent the open end of the fuselage, an outboard extension of said track means hingedly connected to the external end of the track means proper, means supporting said extension from the closure section, and guiding the same to swing into alignment with the track means proper when the closure section swings to its loading position, the extension being of a length when so aligned to extend outwardly beyond the loading position of the closure section, said supporting means further guiding the extension for movement into stowed position within the closure section when the latter swings into its flight position.

8. A cargo airplane as in claim 7, wherein the supporting means for the extension comprises two links, the first of whch is nearer the outer end of the extension and the second nearer its inner end, said first link being fixedly pivoted to each of the extension and the closure section, and the second link includes a pin and slot interconnection between the extension and the closure section.

References Cited in the file of this patent

UNITED STATES PATENTS

| | | |
|---|---|---|
| 2,268,009 | Babb et al. | Dec. 30, 1941 |
| 2,323,279 | Van Zelm | June 29, 1943 |
| 2,404,195 | Schlieben | July 16, 1946 |
| 2,778,512 | Strona | Jan. 22, 1957 |